(12) United States Patent
Fukano et al.

(10) Patent No.: US 7,264,223 B2
(45) Date of Patent: Sep. 4, 2007

(54) FLOW RATE CONTROL APPARATUS

(75) Inventors: Yoshihiro Fukano, Moriya (JP);
Hideaki Yashiro, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/154,510

(22) Filed: Jun. 17, 2005

(65) Prior Publication Data

US 2005/0285067 A1 Dec. 29, 2005

(30) Foreign Application Priority Data

Jun. 23, 2004 (JP) ............................. 2004-184571

(51) Int. Cl.
*F16K 31/02* (2006.01)
(52) U.S. Cl. ............ 251/129.07; 251/282; 251/129.11; 251/331
(58) Field of Classification Search ........... 251/129.11, 251/282, 331, 129.07
See application file for complete search history.

(56) References Cited

U.S. PATENT DOCUMENTS 3,753,526 A * 8/1973 Johnson .................... 236/99 R
3,985,333 A * 10/1976 Paulsen .................. 251/129.07
4,593,881 A * 6/1986 Yoshino ...................... 251/124
4,711,269 A * 12/1987 Sule ......................... 137/625.5
5,007,458 A * 4/1991 Marcus et al. ........... 137/625.5

FOREIGN PATENT DOCUMENTS

| JP | 3-292483 | 12/1991 |
| JP | 5-43914 | 7/1993 |
| JP | 11-136925 | 5/1999 |

* cited by examiner

*Primary Examiner*—Eric Keasel
*Assistant Examiner*—John K. Fristoe, Jr.
(74) *Attorney, Agent, or Firm*—Paul A. Guss

(57) ABSTRACT

A flow rate control valve comprises a rotary driving source which is rotated by a control signal, a movable member which is displaceable by the aid of a transmitting shaft under a rotary action of the rotary driving source, a valve mechanism which is connected to the end of the movable member and which is capable of being seated on and separated from a valve seat of a valve body, and a balance mechanism which is integrally connected underneath the valve mechanism with a connecting shaft intervening therebetween. When the valve opening degree is changed in a state in which pressure fluid is supplied into the valve body, the balance mechanism maintains an equilibrium state with respect to the valve mechanism.

9 Claims, 4 Drawing Sheets

FLOW RATE CONTROL APPARATUS

BACKGROUND OF THE INVENTION

1. Field of the Invention

The present invention relates to a flow rate control apparatus capable of controlling the flow rate of a fluid flowing through a fluid passage. In particular, the present invention relates to a flow rate control apparatus capable of reducing pressure loss occurring in the pressure fluid flowing through the fluid passage.

2. Description of the Related Art

A flow rate control apparatus has been hitherto used to control the flow rate of a pressure fluid flowing through a fluid passage. In such a flow rate control apparatus, the rotary shaft of a rotary driving source, such as a stepping motor, is rotated so that a displacement member, which is screw-engaged with the rotary shaft, is displaced in an axial direction. A valve plug, which is connected to the displacement member, is seated on and separated from a valve seat, under a displacement action of the displacement member, in order to control the flow rate of the pressure fluid flowing through the fluid passage.

For example, a conventional technique used in connection with a flow rate control apparatus is shown in FIG. 4, and adopts the following arrangement. That is, a rotor 2, which is arranged in a stepping motor 1, is rotated under a driving action of the stepping motor 1, which serves as a driving source. A driving rod 3, which is screw-engaged with a central portion of the rotor 2, is moved back and forth in an axial direction under the rotary action of the rotor 2 (see Japanese Laid-Open Patent Publication No. 11-136925).

A valve plug 4, which is connected to a forward end of the driving rod 3, is displaced integrally under the displacement action of the driving rod 3, and the valve plug 4 is separated from an outflow port 6 of a valve body 5. Accordingly, fluid, which is introduced from an inflow port 7 of the valve body 5, flows to the outside via an outflow port 6.

A thin-walled diaphragm 8, which is flexibly deformable, has an inner circumferential portion, which is interposed between the valve plug 4 and the forward end of the driving rod 3. An outer edge portion of the diaphragm 8 is interposed between portions of the valve body 5. The diaphragm 8 retains air tightness with respect to the fluid flowing through the interior of the valve body 5.

In the case of the flow rate control valve according to Japanese Laid-Open Patent Publication No. 11-136925, the degree to which the valve plug 4 is opened changes occasionally, depending on conditions of use thereof, which act to increase or decrease the flow rate of fluid flowing through the interior of the valve body 5.

For example, when the flow rate of fluid flowing through the interior of the valve body 5 is increased or decreased, the valve plug 4 and diaphragm 8 are displaced in a direction to open the valve (i.e., in the direction of arrow X1) or in a direction to close the valve (i.e., in the direction of arrow X2). During this process, the fluid pressure of the fluid is applied to the valve plug 4 and diaphragm 8, which are displaced in a direction to open the valve, and resistance is generated in the flow of fluid as a result of the valve plug 4 and diaphragm 8. Therefore, a pressure loss appears in the fluid.

When the valve opening degree of the valve plug 4 is decreased, under a driving action of the stepping motor 1, it is necessary for the valve plug 4 to be displaced in a direction to close the valve (i.e., in the direction of arrow X2) against the direction of the flow of fluid that flows through the interior of the valve body 5. Therefore, a large load is exerted on the stepping motor 1, as compared to the process in which the valve opening degree of the valve plug 4 is increased.

As a result, it is necessary to use a stepping motor 1 which has a large driving force sufficient to displace the valve plug 4 and diaphragm 8 against the fluid pressure of the fluid. Therefore, a large-scale stepping motor 1 has been required.

SUMMARY OF THE INVENTION

A general object of the present invention is to provide a flow rate control apparatus, which makes it possible to reduce pressure loss generated in the pressure fluid flowing through a fluid passage when a valve opening degree of the valve mechanism is changed.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
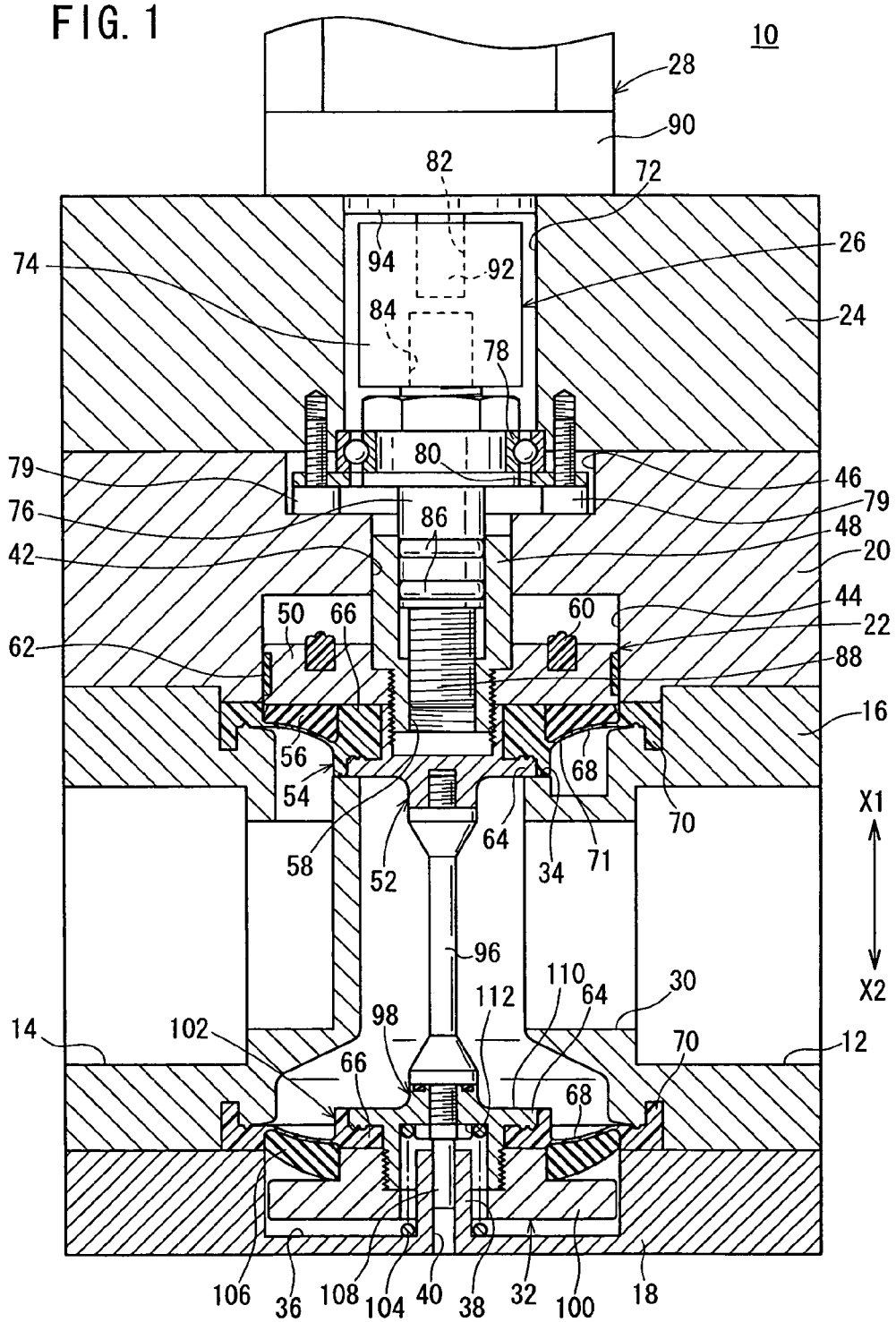
FIG. 1 shows, with partial omission, a vertical sectional view illustrating a flow rate control valve according to an embodiment of the present invention.
Figure 2:
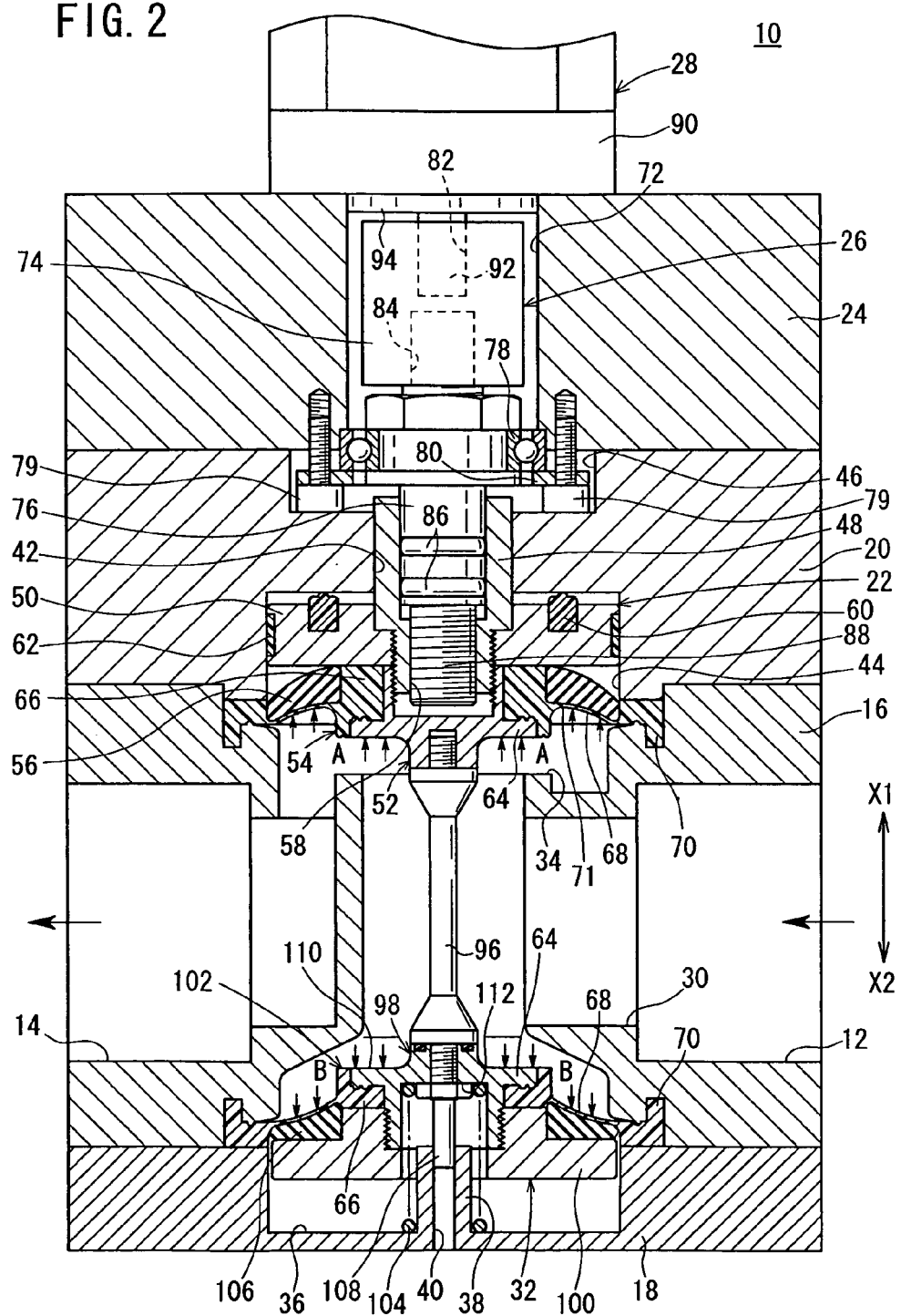
FIG. 2 shows, with partial omission, a vertical sectional view illustrating a valve-open state of the flow rate control valve shown in FIG. 1.

With reference to FIGS. 1 and 2, reference numeral 10 indicates a flow rate control valve, which serves as a flow rate control apparatus according to an embodiment of the present invention.

The flow rate control valve 10 comprises a valve body (body) 16 having a first fluid port 12 and a second fluid port 14 for supplying and discharging a pressure fluid therethrough, a cover member 18 which closes a lower portion of the valve body 16, a first body 20 stacked on the valve body 16, and a valve mechanism 22 which is arranged in the first body 20 and which controls a flow rate of the pressure fluid flowing between the first fluid port 12 and the second fluid port 14.

The flow rate control valve 10 further comprises a second body 24, which is stacked on the first body 20, a driving force-transmitting section 26 which is arranged in the second body 24, a driving section 28 which is connected to a substantially central upper portion of the second body 24 and which is driven and rotated by a control signal (pulse signal) output from an unillustrated power source by the aid of a controller, and a balance mechanism (equilibrium-retaining mechanism) 32 which is arranged between the valve body 16 and the cover member 18 and which maintains an equilibrium state with respect to the pressing force applied to the valve mechanism 22 when the pressure fluid is supplied to a fluid passage 30.

The valve body 16 includes the first fluid port 12 disposed on a side to which the pressure fluid is supplied, the second fluid port 14 through which the pressure fluid supplied from the first fluid port 12 is discharged, and the fluid passage 30 providing communication between the first fluid port 12 and the second fluid port 14. A valve seat 34, on which a main valve body 52 (described later on) is seated, is formed at a position in a substantially central portion of the valve body 16, on the side of the first body 20 (i.e., in the direction of arrow X1).

The plate-shaped cover member 18 is connected to the valve body 16 on a side (i.e., in the direction of arrow X2) opposite to the end to which the first body 20 is connected. Accordingly, the fluid passage 30 of the valve body 16 is closed by the cover member 18. A recess 36, which is recessed by a predetermined depth in a direction (i.e., the direction of arrow X2) to make separation from the valve body 16, is formed at a substantially central portion of the cover member 18. Further, a cylindrical spring guide section 38 is formed in a direction oriented from a substantially central portion of the recess 36 toward the valve body 16.

A guide hole 40, which penetrates in the axial direction, is formed at a substantially central portion of the spring guide section 38. A guide pin 108, which makes up part of a balance mechanism 32, is inserted into the guide hole 40 as described later on.

A through-hole 42, which penetrates in the axial direction, is formed at a substantially central portion of the first body 20. A first installation hole 44, in which the valve mechanism 22 is arranged, is formed to have a diameter larger than the diameter of the through-hole 42, on the side of the valve body 16 (i.e., in the direction of arrow X2) with respect to the through-hole 42. A second installation hole 46, in which a part of the driving force-transmitting section 26 is arranged, is formed to have a diameter larger than the diameter of the through-hole 42, on the side of the second body 24 (i.e., in the direction of arrow X1) with respect to the through-hole 42.

The valve mechanism 22 is arranged between the valve seat 34 of the valve body 16 and the first installation hole 44 of the first body 20.

The valve mechanism 22 comprises a cylindrical movable member 48, which is displaceable in the axial direction under a rotary action of the driving section 28, a first disk 50 which is screw-engaged integrally with the outer circumference of the movable member 48, a main valve body 52 which is connected integrally to the lower end of the movable-member 48, a first diaphragm (first flexible member) 54 which is interposed between the main valve body 52 and the first disk 50, and a first protecting member 56 which mitigates against loads exerted on a skirt section 68 of the first diaphragm 54, as shall be described later on.

The movable member 48 is provided slidably in the axial direction (i.e., the direction of arrows X1 and X2) in the through-hole 42. A female thread section 58 is formed in the movable member 48, to which the end of a transmitting shaft 76 of the driving force-transmitting section 26 is screw-engaged, as shall be described later on.

A buffer member 60, which is composed of an elastic material, is installed in an annular groove on an end surface of the first disk 50, on the side-of the driving section 28 (i.e., in the direction of arrow X1). A seal member 62 is installed in an annular groove on an outer circumferential surface of the first disk 50. An airtight condition is retained in the first installation hole 44 by the seal member 62. The first disk 50 is allowed to slide along the inner circumferential surface of the second installation hole 46, and thus the first disk 50 functions as a guide when the valve mechanism 22 is displaced in the axial direction.

The first diaphragm 54 is composed of an elastic material. The first diaphragm 54 is formed with an inner circumferential section 66, which is interposed between the first disk 50 and a flange section 64 of the main valve body 52, a thin-walled skirt section 68 which extends radially outwardly from the inner circumferential section 66, and an outer edge section 70 which is formed on the outer circumferential side of the skirt section 68. The outer edge section 70 is interposed between the valve body 16 and the first body 20. The main valve body 52 and the inner circumferential section 66 of the first diaphragm 54 are seated on the valve seat 34 of the valve body 16, and thus communication between the first fluid port 12 and the second fluid port 14 is blocked.

The first protecting member 56 is arranged in a space formed between the skirt section 68 and the first disk 50.

Side surfaces of the first diaphragm 54 and the main valve body 52 opposed to the balance mechanism 32 function as a first pressure-receiving surface (first pressure-receiving section) 71, which receives the pressure of the pressure fluid when the pressure fluid flows through the fluid passage 30.

An insertion hole 72, which penetrates in the axial direction, is formed at a substantially central portion of the second body 24. The driving force-transmitting section 26, which transmits a rotary driving force to the valve mechanism 22 from a rotary driving source 90 (described later on) of the driving section 28, is arranged in the insertion hole 72.

The driving force-transmitting section 26 includes a coupling member 74, which is arranged in the insertion hole 72 of the second body 24 and which is engaged with an end of a rotary shaft 92 of the rotary driving source 90, a transmitting shaft 76 which is engaged with the coupling member 74, a bearing 78 which rotatably retains the transmitting shaft 76, and a disk-shaped fixation plate 80 which fixes the bearing 78 to the second body 24 by the aid of screw members 79.

The coupling member 74 is formed to be substantially columnar. An end of the rotary shaft 92 (described later on) is inserted into a first engaging hole 82 disposed at one end of the coupling member 74, and an end of the transmitting shaft 76 is inserted into a second engaging hole 84 disposed at the other end.

That is, the rotary shaft 92 is engaged with one end of the coupling member 74, and the transmitting shaft 76 is engaged with the other end of the coupling member 74. The rotary shaft 92 and the transmitting shaft 76 are mutually regulated in the rotational direction with respect to the coupling member 74. Therefore, the transmitting shaft 76 is rotated integrally, while in a state of being retained by the bearing 78 and by the aid of the coupling member 74, under the rotary action of the rotary shaft 92.

The transmitting shaft 76 has an end thereof inserted into the movable member 48. The end of the transmitting shaft 76 abuts against the inner circumferential surface of the movable member 48, by the aid of a seal member 86 installed to the outer circumferential surface. Therefore, an airtight condition is retained in the through-hole 42 by the seal member 86.

A male thread section 88, which includes threads engraved on an outer circumferential surface thereof, is formed at the end of the transmitting shaft 76. The male thread section 88 is screw-engaged with a female thread section 58, which is engraved on the inner circumferential surface of the movable member 48. A clearance (backlash), which provides a predetermined spacing distance in the axial direction, is formed between the male thread section 88 and the female thread section 58, so that the transmitting shaft 76 is capable of making screw engagement with the movable member 48.

The driving section 28 comprises a rotary driving source 90, which is rotated in accordance with a control signal (pulse signal) output from an unillustrated power source by the aid of the controller, and a rotary shaft 92, which transmits rotational force of the rotary driving source 90.

The rotary driving source 90 is positioned at a substantially central portion of the second body 24 such that an engaging projection 94, which protrudes toward the second body 24 (i.e., in the direction of arrow X2), engages with the insertion hole 72 of the second body 24. The rotary shaft 92 is inserted through the insertion hole 72 of the second body 24, and further, the rotary shaft 92 is inserted into the first engaging hole 82 of the coupling member 74.

The rotary driving source 90 is composed of, for example, a stepping motor, which is rotated in a stepped manner corresponding to the number of pulses of the control signal (pulse signal) output from an unillustrated controller.

An unillustrated detecting section is provided for the rotary driving source 90, in order to detect an amount of rotation, such as the number of revolutions or the angle of rotation, of the rotary driving source 90. The detecting section is composed of, for example, an encoder, which is provided integrally so that the detecting section is coaxial with the rotary driving source 90.

The balance mechanism 32 is arranged between the valve body 16 and the recess 36 of the cover member 18, so that the balance mechanism 32 is opposed to the valve mechanism 22.

The balance mechanism 32 comprises a connecting member 98, which is connected to the main valve body 52 by the aid of a connecting shaft 96, a second disk 100 which is screw-engaged with the connecting member 98, a second diaphragm (second flexible member) 102 which has its inner circumferential side interposed between the connecting member 98 and the second disk 100, a spring 104 which urges the connecting member 98 toward the driving section 28 (i.e., in the direction of arrow X1), a second protecting member 106 which is arranged between the skirt section 68 of the second diaphragm 102 and the second disk 100, and a guide pin 108, which protrudes on the side of the cover member 18 (i.e., in the direction of arrow X2) with respect to the connecting member 98. The second protecting member 106 is displaceable integrally with the skirt section 68 of the second diaphragm 102, and thus the skirt section 68, which is thin-walled, is protected by the protecting member 106.

The elongate connecting shaft 96 has one end that is integrally screw-engaged with the main valve body 52, and another end that is screw-engaged with the connecting member 98. More specifically, the valve mechanism 22 and the balance mechanism 32 are connected to each other by the aid of the connecting shaft 96, and the valve mechanism 22 and the balance mechanism 32 are linearly connected to one another coaxially along a straight line, by the aid of the connecting shaft 96.

The second diaphragm 102 is composed of an elastic material. The second diaphragm 102 includes an inner circumferential section 66, which is interposed between the second disk 100 and the flange section 64 of the connecting member 98, a thin-walled skirt section 68 which extends radially outwardly from the inner circumferential section 66, and an outer edge section 70, which is formed on an outer circumferential side of the skirt section 68. The outer edge section 70 is interposed between the valve body 16 and the cover member 18.

Side surfaces of the second diaphragm 102 and the connecting member 98, which are opposed to the valve mechanism 22, function as a second pressure-receiving surface (second pressure-receiving section) 110, and receive a pressure of the pressure fluid when the pressure fluid flows through the fluid passage 30.

The pressure-receiving area of the second pressure-receiving surface 110 is designed to be substantially equivalent to the pressure-receiving area of the first pressure-receiving surface 71 composed of the first diaphragm 54 and the main valve body 52 of the valve mechanism 22.

The spring 104 has one end inserted around an outer circumferential side of the spring guide section 38, while the other end thereof is installed into a spring-receiving hole 112 formed at a substantially central portion of the connecting member 98.

The guide pin 108 is inserted displaceably in the axial direction into the guide hole 40 of the spring guide section 38. Therefore, the guide pin 108 is guided appropriately in the axial direction, while the connecting member 98 is displaced integrally with the valve mechanism 22, by the aid of the connecting shaft 96.

The above embodiment of the present invention is illustrative of a flow rate control valve 10, which serves as the flow rate control apparatus. However, there is no particular limitation thereto, insofar as the flow rate control apparatus performs a flow rate controlling function for the pressure fluid, linearly in proportion to a control signal output from an unillustrated controller or the like.

The flow rate control valve 10 according to the embodiment of the present invention is basically constructed as described above. Next, its operation, function, and effect shall be explained.

FIG. 1 shows a valve-closed state in which the first diaphragm 54 of the valve mechanism 22 is seated on the valve seat 34 of the valve body 16, thus blocking communication between the first fluid port 12 and the second fluid port 14.

At first, starting from a valve-closed state as described above, a control signal based on a predetermined preset value is output to the rotary driving source 90 of the driving section 28 from an unillustrated power source, by the aid of the controller. Accordingly, the rotary shaft 92 of the rotary driving source 90 is rotated in accordance with the control signal.

The coupling member 74, which is engaged by the aid of the first engaging hole 82, is rotated under a rotary action of the rotary shaft 92. Further, the transmitting shaft 76, which is engaged with the second engaging hole 84, is rotated under a rotary action of the coupling member 74.

The movable member 48, which is screw-engaged with the end of the transmitting shaft 76, is displaced, through a screw-engaging action, toward the driving section 28 (i.e., in the direction of arrow X1) along an inner circumferential surface of the through-hole 42. In other words, the rotary motion of the transmitting shaft 76 is converted into rectilinear motion in an axial direction (i.e., the direction of arrow X1) of the movable member 48, under screw-engaging actions of the male thread section 88 of the transmitting shaft 76 and the female thread section 58 of the movable member 48.

As a result, as shown in FIG. 2, the main valve body 52, the first diaphragm 54, and the first disk 50, which are connected to the lower end of the movable member 48, are displaced integrally toward the driving section 28 (i.e., in the direction of arrow X1). When the valve mechanism 22 is displaced toward the driving section 28, the buffer member 60, which is installed on the first disk 50, abuts against an end surface of the first installation hole 44, and thus impact exerted on the valve mechanism 22 is mitigated.

Subsequently, the valve mechanism 22 is displaced toward the driving section 28, and the main valve body 52 and the end surface of the inner circumferential section 66 of the first diaphragm 54 are separated from the valve seat 34 of the valve body 16. As a result, the first fluid port 12 and the second fluid port 14 communicate with each other via the fluid passage 30, and the pressure fluid flows from the first fluid port 12 to the second fluid port 14.

Further, the rotary driving source 90 is rotated in accordance with the control signal output from the controller (not shown), whereby the valve mechanism 22 is displaced in the axial direction (i.e., in the direction of arrow X1). Accordingly, it is possible to control the flow rate of the pressure fluid flowing through the interior of the fluid passage 30.

Figure 3:
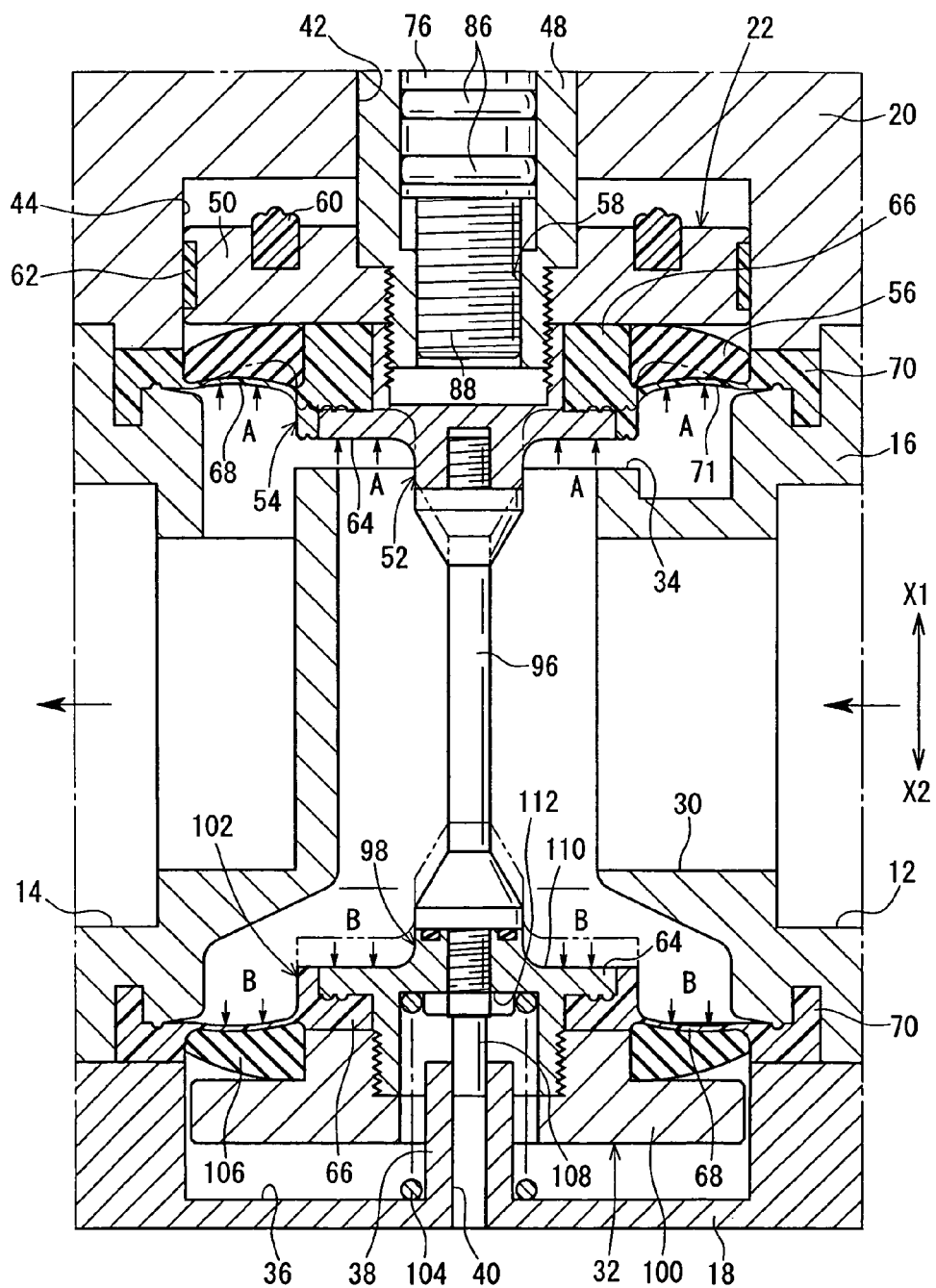
FIG. 3 shows a magnified vertical sectional view illustrating a state in which the valve opening degree of a valve mechanism of the flow rate control valve shown in FIG. 1 is decreased by a predetermined amount.
Figure 4:
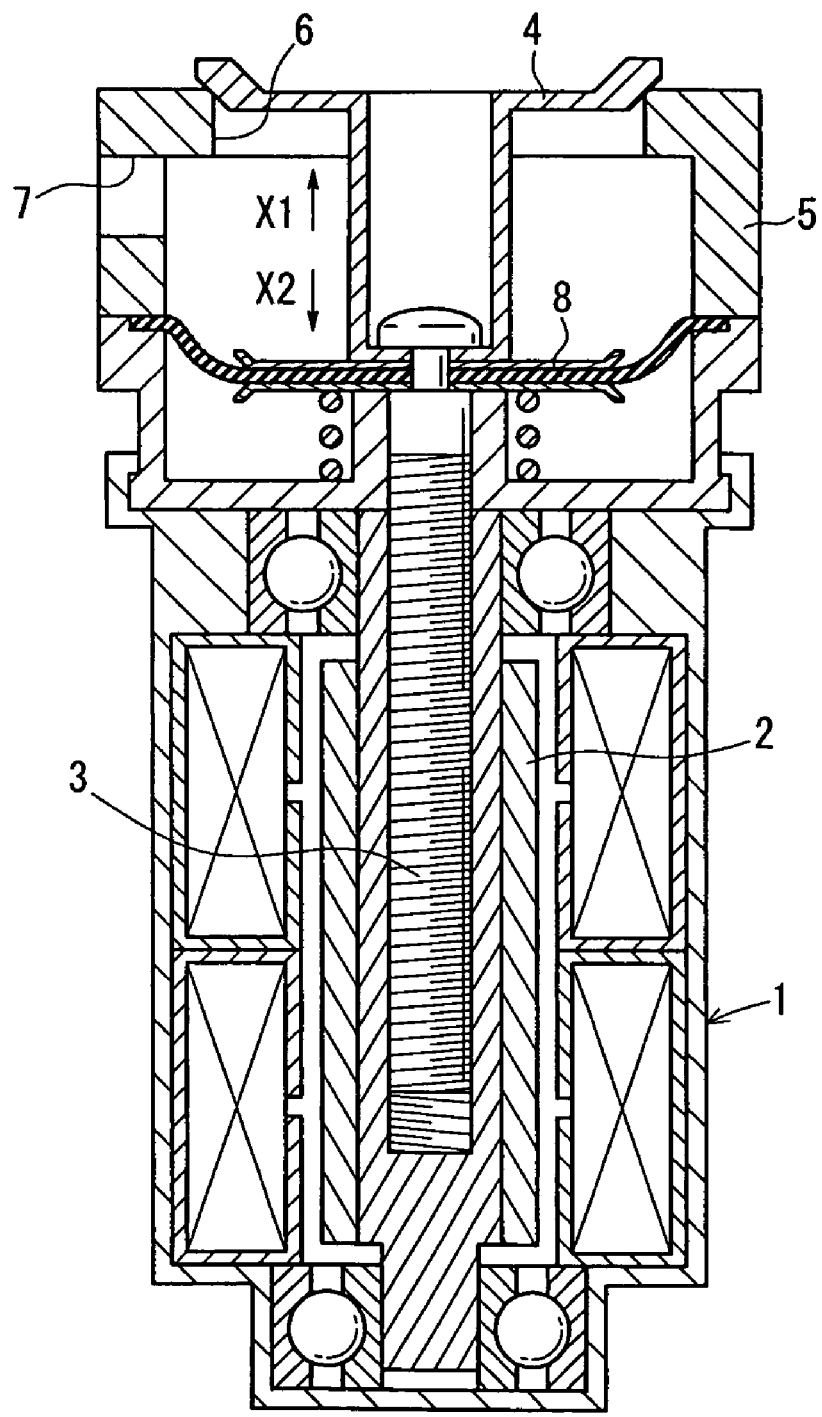
FIG. 4 shows a vertical sectional view illustrating a flow rate control valve in accordance with a conventional technique.

Next, an explanation shall be given concerning a procedure in which the valve opening degree of the valve mechanism 22 is changed by a predetermined amount in order to adjust, i.e., to increase or decrease, the flow rate of the pressure fluid, during a valve-open state in which the valve mechanism 22 is separated from the valve seat 34 and the pressure fluid is allowed to flow through the fluid passage 30 (see FIG. 3).

At first, the rotary driving source 90 is driven to rotate the rotary shaft 92 on the basis of a control signal supplied from an unillustrated controller, during a state in which pressure fluid flows through the fluid passage 30. The movable member 48 is displaced toward the driving section 28 (i.e., in the direction of arrow X1) or toward the valve body 16 (i.e., in the direction of arrow X2) under a rotary action of the rotary shaft 92. The main valve body 52 and the first diaphragm 54 of the valve mechanism 22, which is connected to the movable member 48, are displaced toward the driving section 28 or toward the valve body 16. Accordingly, it is possible to adjust, i.e., to increase or decrease, the flow rate of the pressure fluid flowing through the fluid passage 30.

On the other hand, as shown in FIG. 3, a pressing force A is applied toward the driving section 28 due to the pressure fluid, wherein the pressing force A is applied to the first pressure-receiving surface 71 composed of side surfaces of the main valve body 52 and the first diaphragm 54 of the valve mechanism 22. Similarly a pressing force B is applied toward the valve body 16 due to the pressure fluid flowing through the fluid passage 30, wherein the pressing force B is applied to the second pressure-receiving surface 110 composed of side surfaces of the connecting member 98 and the second diaphragm 102 of the balance mechanism 32.

The first pressure-receiving surface 71 and the second pressure-receiving surface 110 are formed so that the pressure-receiving areas thereof are substantially equivalent to one another. Therefore, the magnitude of the pressing force A that urges the valve mechanism 22 having the first pressure-receiving surface 71 toward the driving section 28 (i.e., in the direction of arrow X1) is substantially equivalent to the magnitude of the pressing force B that urges the balance mechanism 32 having the second pressure-receiving surface 110 toward the valve body 16 (i.e., in the direction of arrow X2) (A≈B).

Accordingly, the pressing force A and the pressing force B offset one another and are in balance with each other, providing an equilibrium state, because the direction of the pressing force A applied to the valve mechanism 22 (i.e., in the direction of arrow X1) and the direction of the pressing force B applied to the balance mechanism 32 (i.e., in the direction of arrow X2) are opposite to one another.

That is, an equilibrium state is established in which the pressing force A and the pressing force B are in balance with each other. Therefore, the valve mechanism 22 and the balance mechanism 32 are not displaced in the axial direction (i.e., in the direction of arrows X1 and X2) as a result of the pressing force of the pressure fluid (fluid pressure).

Therefore, an equilibrium state is retained by the balance mechanism 32. When the valve mechanism 22 is displaced toward the driving section 28 (i.e., in the direction of arrow X1) or toward the valve body 16 (i.e., in the direction of arrow X2) under a driving action of the rotary driving source 90, flow of the pressure fluid flowing through the fluid passage 30 is not disturbed.

As a result, the pressure fluid is pressed toward the driving section 28 or toward the valve body 16, by the main valve body 52 and the first diaphragm 54, under a displacement action of the valve mechanism 22. In such a situation, the balance mechanism 32 also is displaced toward the valve body 16 in an integrated manner. Accordingly, it is possible to reduce pressure loss generated in the pressure fluid flowing through the fluid passage 30.

Further, when the valve mechanism 22 and the balance mechanism 32 are balanced with each other, the valve mechanism 22 and the balance mechanism 32 are not displaced in the axial direction (i.e., in the direction of arrows X1 and X2). Therefore, the movable member 48 of the valve mechanism 22 is prevented from being displaced toward the driving section 28 by an amount of clearance formed between the female thread section 58 and the male thread section 88 of the transmitting shaft 76.

Therefore, the male thread section 88 and the female thread section 58 do not make any sudden contact which would be otherwise caused by such a clearance, while the movable member 48 remains displaceable in the axial direction, by an amount of the clearance, with respect to the transmitting shaft 76 under the pressing action of the pressure fluid. As a result, it is possible to avoid impact exerted on the transmitting shaft 76 and the movable member 48 generated upon contact therebetween. It is also possible to improve the durability of the transmitting shaft 76 on which the male thread section 88 is engraved, as well as the durability of the movable member 48 on which the female thread section 58 is engraved.

As described above, in the embodiment of the present invention, a valve mechanism 22 is provided, which has a first pressure-receiving surface 71 for receiving the pressure of the pressure fluid, and a balance mechanism 32 is provided at a position opposed to the valve mechanism 22, with a connecting shaft 96 intervening therebetween. Further, a second pressure-receiving surface 110, which has a pressure-receiving area substantially equivalent to that of the first pressure-receiving surface 71, is formed for the balance mechanism 32.

Further, when the pressure fluid is allowed to flow through the fluid passage 30, the magnitude of the pressing force A exerted by the pressure fluid on the first pressure-receiving surface 71 of the valve mechanism 22 is substantially equivalent to the magnitude of the pressing force B exerted on the second pressure-receiving surface 110 of the balance mechanism 32 (A≈B). Therefore, the pressing force A and the pressing force B, which are applied in substantially opposite directions, offset one another.

Accordingly, when the flow rate of the pressure fluid is changed while the pressure fluid is allowed to flow through the fluid passage 30, it is possible to provide a state in which the pressing force A applied to the valve mechanism 22 is balanced with the pressing force B applied to the balance mechanism 32. Therefore, a state of equilibrium is established, in which the valve mechanism 22 and the balance mechanism 32 are balanced with each other.

Therefore, it is possible to suppress the tendency of the valve mechanism 22 to impart resistance against the flow of the pressure fluid, and it is possible to reduce pressure loss generated in the pressure fluid flowing through the fluid passage 30, because the valve mechanism 22 and the balance mechanism 32 are retained in an equilibrium state during periods when the valve opening degree is changed by displacing the valve mechanism 22 to increase or decrease the flow rate of the pressure fluid flowing through the fluid passage 30.

When the flow rate of the pressure fluid flowing through the fluid passage 30 is controlled by the aid of the valve mechanism 22, an equilibrium state is established, in which the valve mechanism 22 is balanced with the balance mechanism 32. Accordingly, it is possible to conserve the driving force required when the valve mechanism 22 is displaced toward the valve body 16, by means of the balance mechanism 32.

Thus, it is possible to suppress the driving load exerted on the rotary driving source 90. Accordingly, a small sized rotary driving source 90 can be used, thus making it possible to reduce the cost of the rotary driving source 90.

Although certain preferred embodiments of the present invention have been shown and described in detail, it should be understood that various changes and modifications may be made therein without departing from the scope of the appended claims.

What is claimed is:

1. A flow rate control apparatus for controlling a flow rate of a pressure fluid, the flow rate control apparatus comprising:

a body in which a fluid passage for allowing said pressure fluid to flow therethrough is formed;

a valve mechanism, having a main valve body and a first flexible member connected to said main valve body, said main valve body and said first flexible member being seated on and separated from a valve seat of said body under a driving action of a driving section driven by an electric signal, so as to control said flow rate of said pressure fluid flowing through said fluid passage; and an equilibrium-retaining mechanism, which is connected at a position opposed to said valve mechanism, and which has a connecting member and a second flexible member connected to said connecting member, said connecting member and said second flexible member maintaining an equilibrium state with respect to said main valve body and said first flexible member during a valve open state when said main valve body and said first flexible member are separated from said valve seat, in accordance with a fluid pressure of said pressure fluid when said flow rate of said pressure fluid flowing through said fluid passage is changed, wherein, in said valve open state, side surfaces of said first flexible member and said main valve body function jointly as a first pressure-receiving section when said main valve body and said first flexible member are separated from said valve seat, while side surfaces of said connecting member and said second flexible member function jointly as a second pressure-receiving section, and wherein, in a valve closed state, said equilibrium state is not retained and only a partial pressure receiving area of said main valve body is exposed to said fluid while a full pressure receiving area of said second pressure-receiving section is exposed to said fluid.

2. The flow rate control apparatus according to claim 1, wherein said first flexible member and said second flexible member are opposed to one another in said body with said fluid passage intervening therebetween, and said first flexible member and said second flexible member are connected to one another by a shaft arranged between said first flexible member and said second flexible member.

3. The flow rate control apparatus according to claim 2, wherein said first flexible member is formed with said first pressure-receiving section for receiving said fluid pressure of said pressure fluid when said pressure fluid flows through said fluid passage, and said second flexible member is formed with said second pressure-receiving section for receiving said fluid pressure of said pressure fluid when said pressure fluid flows through said fluid passage.

4. The flow rate control apparatus according to claim 3, wherein, in said valve open state, said first pressure-receiving section has a pressure-receiving area which is set to be substantially the same as said full pressure receiving area of said second pressure-receiving section.

5. The flow rate control apparatus according to claim 2, wherein said first flexible member and said second flexible member are arranged coaxially with said shaft.

6. The flow rate control apparatus according to claim 1, wherein said equilibrium-retaining mechanism includes a resilient member which presses said second flexible member toward said first flexible member.

7. The flow rate control apparatus according to claim 1, wherein said valve mechanism comprises a cylindrical movable member, which is displaceable in the axial direction under a rotary action of the driving section.

8. The flow rate control apparatus according to claim 7, wherein said driving section comprises a rotary driving source rotated in accordance with a control signal output, and a rotary shaft that transmits rotational force of the rotary driving source to a threaded shaft of said valve mechanism, said threaded shaft including threads engraved on an outer circumferential surface thereof.

9. The flow rate control apparatus according to claim 8, wherein said rotary driving source comprises a stepping motor.

* * * * *